United States Patent
Balachandran et al.

(10) Patent No.: US 7,873,067 B2
(45) Date of Patent: Jan. 18, 2011

(54) ADAPTIVE METHOD OF FLOOR CONTROL WITH FAST RESPONSE TIME AND FAIRNESS IN COMMUNICATION NETWORK

(75) Inventors: Krishna Balachandran, Morganville, NJ (US); Thomas P. Chu, Englishtown, NJ (US); Joseph H. Kang, Belle Mead, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 950 days.

(21) Appl. No.: 11/647,930

(22) Filed: Dec. 29, 2006

(65) Prior Publication Data

US 2008/0159177 A1    Jul. 3, 2008

(51) Int. Cl.
 *H04J 3/02* (2006.01)
(52) U.S. Cl. ........................ 370/462; 455/403
(58) Field of Classification Search ......... 370/260–262, 370/270, 416, 461–462, 444, 447, 346, 449; 379/202.01; 455/416
 See application file for complete search history.

(56) References Cited

U.S. PATENT DOCUMENTS

| | | | | | |
|---|---|---|---|---|---|
| 4,479,211 | A | * | 10/1984 | Bass et al. | 370/261 |
| 5,251,214 | A | * | 10/1993 | Mertens et al. | 370/475 |
| 5,511,232 | A | * | 4/1996 | O'Dea et al. | 455/519 |
| 5,654,968 | A | * | 8/1997 | Smiroldo | 370/443 |
| 5,889,764 | A | * | 3/1999 | Needham et al. | 370/263 |
| 6,160,812 | A | * | 12/2000 | Bauman et al. | 370/416 |
| 6,301,263 | B1 | * | 10/2001 | Maggenti | 370/462 |
| 6,516,369 | B1 | * | 2/2003 | Bredin | 710/111 |
| 6,519,264 | B1 | * | 2/2003 | Carr et al. | 370/449 |
| 6,744,780 | B1 | * | 6/2004 | Gu et al. | 370/450 |
| 6,920,148 | B1 | * | 7/2005 | Kato | 370/442 |
| 6,970,926 | B1 | * | 11/2005 | Needham et al. | 709/225 |
| 6,990,116 | B1 | * | 1/2006 | Young et al. | 370/445 |
| 6,999,414 | B2 | * | 2/2006 | Gummalla et al. | 370/230 |
| 7,054,330 | B1 | * | 5/2006 | Chou et al. | 370/462 |
| 7,062,582 | B1 | * | 6/2006 | Chowdhuri | 710/116 |
| 7,079,857 | B2 | * | 7/2006 | Maggenti et al. | 370/447 |
| 7,085,244 | B2 | * | 8/2006 | Koskelainen et al. | 370/261 |
| 7,099,650 | B2 | * | 8/2006 | Akgun et al. | 455/403 |
| 7,110,380 | B2 | * | 9/2006 | Shvodian | 370/336 |
| 7,146,152 | B2 | * | 12/2006 | Akgun et al. | 455/403 |
| 7,281,071 | B2 | * | 10/2007 | Carey | 710/113 |
| 7,352,741 | B2 | * | 4/2008 | Eberle et al. | 370/389 |

(Continued)

*Primary Examiner*—Ricky Ngo
*Assistant Examiner*—Ben H Liu
(74) *Attorney, Agent, or Firm*—McCormick, Paulding & Huber LLP

(57) ABSTRACT

In a floor control system for a network, a floor control server controls a floor-based application for communications between multiple participant terminals. The server carries out a floor determination process that includes an adaptive waiting function. Upon receiving an initial floor request message, the server waits for additional requests before determining the floor winner. The wait time is a function of the floor request load. When the system is lightly loaded, the wait time is generally small. For heavier request loads, the wait time is generally longer, to ensure that a reasonable number of requests are received before awarding the floor. The wait time may be limited by a maximum wait time, which is a function of the floor request load. If a designated number of floor requests is received before the maximum wait time expires, a temporary floor winner is granted the floor if its priority is sufficiently high.

19 Claims, 6 Drawing Sheets

U.S. PATENT DOCUMENTS

| | | | |
|---|---|---|---|
| 7,359,725 B2* | 4/2008 | Bhutiani | 455/518 |
| 7,386,645 B2* | 6/2008 | Chalopin et al. | 710/241 |
| 7,433,953 B1* | 10/2008 | Kappler et al. | 709/226 |
| 7,616,967 B2* | 11/2009 | Coulas | 455/518 |
| 2002/0077136 A1* | 6/2002 | Maggenti et al. | 455/518 |
| 2003/0008657 A1* | 1/2003 | Rosen et al. | 455/452 |
| 2003/0235184 A1* | 12/2003 | Dorenbosch et al. | 370/352 |
| 2005/0088981 A1* | 4/2005 | Woodruff et al. | 370/260 |
| 2005/0124365 A1* | 6/2005 | Balasuriya et al. | 455/518 |
| 2006/0056440 A1* | 3/2006 | Khartabil | 370/447 |
| 2006/0294243 A1* | 12/2006 | Kuure et al. | 709/227 |
| 2008/0201407 A1* | 8/2008 | Fodor | 709/203 |

\* cited by examiner

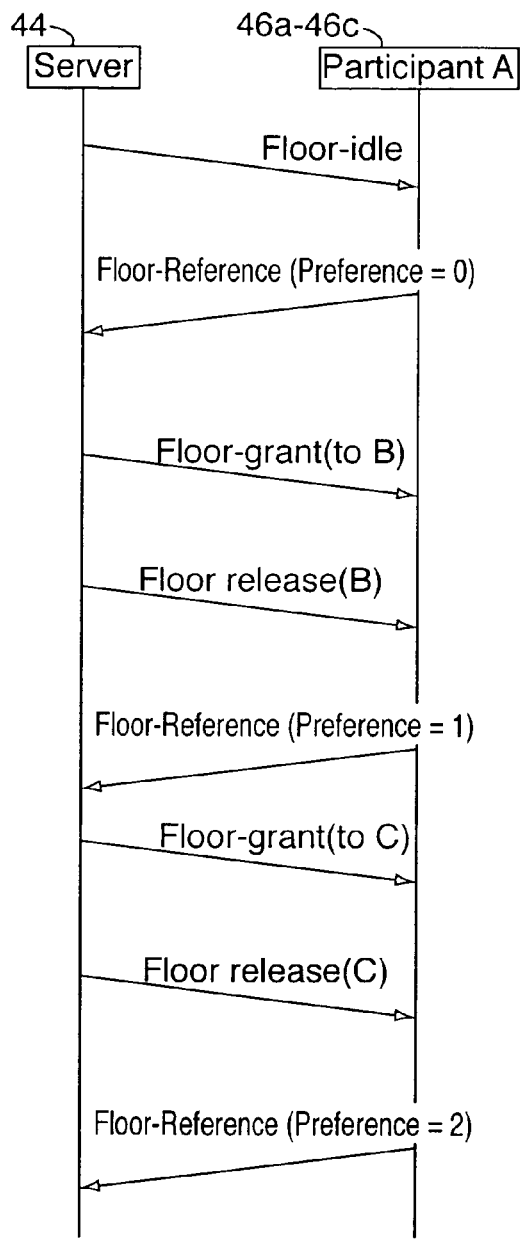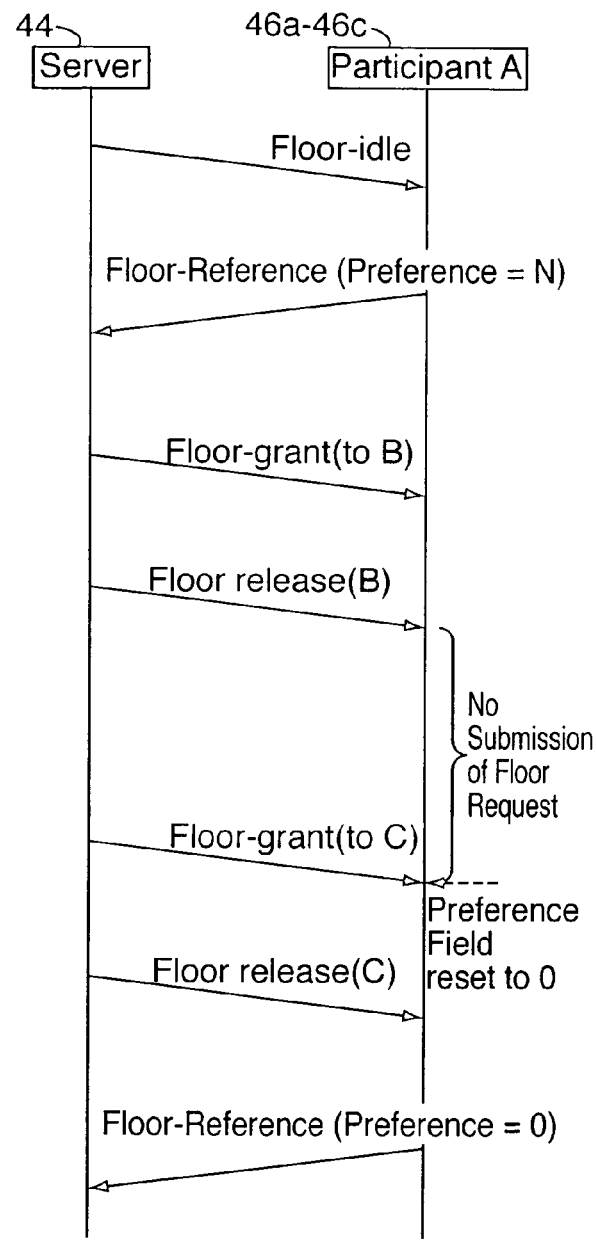
FIG. 7
FIG. 8

ADAPTIVE METHOD OF FLOOR CONTROL WITH FAST RESPONSE TIME AND FAIRNESS IN COMMUNICATION NETWORK

FIELD OF THE INVENTION

The present invention relates to communications and, more particularly, to methods of floor control in communication applications such as conferencing and push-to-talk.

BACKGROUND OF THE INVENTION

Referring to FIGS. 1A and 1B, in applications such as video and audio conferencing in a communication network 10, one of the desired modes of operation is to have a single participant 12a be the speaker at any one time, i.e., to "gain the floor." Therefore, in most instances, the conferencing equipment provides a mechanism to arbitrate who should gain the floor among all the participants 12a-12c of the conference call/communication 14. (In this context, "participant" refers to an electronic device/terminal communicating over the network for the conference call.) In general, a floor control server (FCS) 16 is deployed in the system to be the arbitrator of a conference call. Logical control channels are established between each conference participant 12a-12c and the server 16 for the transmission of control messages that regulate the conferencing. The control messages vary from system to system, with different levels of functionality.

According to a basic control method, when a participant 12a wants to gain the floor, it sends a "floor-request" message 18 to the server 16. It is possible that multiple participants request the floor at roughly the same time. Upon receipt of the floor-request(s) 18 from the participant(s), the server 16 determines the floor winner based on a designated process. The process used to determine the floor winner is referred to as the floor control or floor determination algorithm. Once the floor winner is determined, the server 16 sends a "floor-grant" message 20 to all the participants, or to a subset of all the participants (e.g., only to the floor winner, only to participants who have submitted a floor control request message, or the like). This message includes the identity of the floor winner. Each participant that has requested the floor may wait for the floor grant message 20 to determine whether it has won the floor, or it may receive an implicit grant denial if it does not receive the floor within a predetermined period of time. The floor winner is enabled for transmitting data/media 22 (e.g., speech, other audio, and/or video) over the network 10 to the other participants. The data traffic is logically separate from the floor control messages.

When a participant terminal 12a is directed to stop transmitting data and yield the floor (e.g., the user stops speaking, or a transmit pressel or other switch is deactivated), it sends a "floor-release" message 24 to the server 16. The server 16 propagates this message (or sends another message 26) to the other conference participants for informing them that the floor is again open. If none of the participants want the floor, the server 16 may, after some time, periodically choose to broadcast a "floor-idle" 28 message to the participants.

"Contention" occurs when two or more participants request the floor at the same time. The floor control algorithm is resident on the server 16 for selecting a floor winner among all the requests. An example of floor contention is shown in FIG. 2. As indicated, the server 16 receives floor request messages 18a, 18b from two participants 12a, 12b, respectively. After carrying out the floor control algorithm/process, the server 16 grants the floor to the second participant 12b, transmitting a floor-grant message 20 to this effect.

There are many variations of the above procedure. For example, a server may decide to send a "floor-denied" message to all participants who have requested the floor but fail to win it, instead of relying on the floor-grant message indicating that another participant has won the floor.

Certain communication networks utilize a hierarchical server structure 30, as shown in FIGS. 3A and 3B. Here, to provide load balancing and to improve resiliency, a number of load servers are deployed in a hierarchical tree topology. Logically, floor control of the conference call is still executed at a single master server 32, at the root of the tree. Each server executes its own floor control algorithm. When an auxiliary server 34a-34e determines a local floor winner, it sends a floor request message to its upstream server on behalf of the floor winner. The upstream server then determines its local floor winner from floor-requests received from participants 36 and from downstream servers directly connected to it. The master server 32 determines the global floor winner based on the floor requests directed to it, and broadcasts a floor-grant message to all downstream servers directly connected to the master server 32. The downstream servers propagate this message using the same process. Eventually, all participants of the conference receive the floor-grant message.

A similar procedure applies to the floor-idle message (broadcast down) and the floor release message (propagate-up, no contention).

Regarding floor priority, the basic procedure described above assumes that all floor requests have equal priority. In actual applications, some floor requests have higher priorities than others. For example, in a public safety network, a floor request generated by a policeman reporting a fire may have a higher priority than normal, non-emergency requests. Priority of the floor requests can be encoded in the floor-request messages. Usually included in the floor request message are two fields: contention priority and preemptive priority. (Some implementations may have only one of the two fields.) The present disclosure adopts the convention that a higher value of these fields will indicate higher priority.

Contention priority indicates the priority of the floor request and is used by the server to determine the floor winner. Preemptive priority is more severe. When a server 16 receives a floor request with a preemptive priority "N," if N has a higher priority than the contention priority of the current speaker (e.g., the terminal/participant currently granted the floor), the server terminates the floor of the current speaker and awards the floor to the participant with preemptive priority "N". If multiple floor request messages with preemptive priorities greater than the contention priority of the current speaker are received, the server terminates the floor of the current speaker and awards the floor to the participant with the highest preemptive priority. For a given participant terminal, the contention and preemptive priorities of a floor request do not have to be equal. However, the contention priority will typically be at least the value of the preemptive priority. It may also be the case that preemptive priorities are not compared to contention priorities (e.g., there may be rules in which preemptive priorities always outrank contention priorities), but rather only with preemptive priorities of other requests.

Certain performance criteria are associated with floor control processes in communication networks. One such criterion in push-to-talk applications is the floor control response time. This is measured as the time between when a participant sends a floor request message to the time when a floor-grant message is received. For many applications such as push-to-talk in public safety networks, this is a critical performance parameter.

Another criterion is the "fairness" of the floor control algorithm. Here, the definition of fairness is that, for the same priority, participants should have a generally equal probability of winning a floor request over a designated time period. In other words, on a time average basis, participants should have equal chances of gaining the floor.

The most simple floor control algorithm is a "first come first served" (FCFS) system. In such a system, the server grants the floor to the originator of the first floor request to be received. Apart from its simplicity, the FCFS system has a good response time, since there is no waiting involved at the server. However, FCFS systems have poor fairness characteristics. For example, there may be two participant terminals 12a, 12b positioned at different locations in the network, wherein the time elapsed from floor request message transmission to server reception may be shorter for terminal 12a. In this case, terminal 12a will be awarded the floor more frequently than terminal 12b in situations where both transmit a floor request at similar times. Thus, an FCFS system favors participants that have a shorter transmission delay over those with longer delays.

One way of introducing fairness is for the server, upon receiving the first floor request, to wait some time for additional requests from other participants before making a decision to award the floor to one of the participants. In this way, greater fairness can be achieved. The downside, however, is that this method reduces the response time since the server has to wait before it makes a decision.

In simple systems, the server does not have memory. Therefore, a participant that loses a floor request must generate a new floor request when the current speaker leaves the floor. In more complex systems, the server may decide to put all the requests on a queue. The server then awards the floor to the requests that have been queued up. Such algorithms are referred to as "queued" systems. Generally, queued systems have good characteristics for both response time and fairness. However, an additional layer of control may be required for handling the queue. For example, in the case of first and second users in a public safety network application, both may request the floor for reporting the same incident, such as a fire. If the first user wins the initial floor control and reports the incident to all participants, the second user may no longer want the floor because the incident is already reported. Thus, it may be desirous to include additional control messages in a queued system so that a participant can indicate to the server that although the user had requested the floor previously, the user no longer wants the floor. This would add additional complexity to both the server and the terminal equipment.

In another example, many push-to-talk applications are implemented across wireless networks. After a server puts a participant's request on the queue, the participant may wander out of the network's coverage area. In this case, the server may award the floor to a participant who is no longer active in the network. One solution for such situations is to have the server keep track of the active participants of a conference. When the server detects that a participant is no longer available, the server deletes any requests from that user in its queue. The mechanism for detecting when participants with queued requests leave the network would add additional complexity to the system. For applications such as public safety networks, where talk groups can easily span hundreds of participants, this may become impractical.

In another solution, instead of keeping track of a participant, the server ascertains the presence of the participant when it awards the floor to that participant. Again, this increases the complexity of the control protocol. Also, if the participant is not in the system, this increases the response time since the floor is being awarded to a participant that is no longer present. Additionally, some networks (e.g., wireless networks) cannot keep track of participants leaving the network. Then, the server has to ascertain the presence of the participant, or detects its absence. In these instances, additional delays are incurred.

Thus, robust queued systems, in general, have more control messages and involve more complex control procedures. In addition, queued systems do not scale well when the number of participants is large.

SUMMARY OF THE INVENTION

The present invention relates to a floor control system with good characteristics in terms of both response time and fairness. The system includes a floor determination process that utilizes an adaptive waiting period for decision. During periods of light request loads, the wait time will typically be small. As the load increases, the waiting period typically increases, ensuring that all participants requesting the floor have a fair chance of gaining access.

In another embodiment, the wait time depends on three parameters: $\Delta$, N, and P, where $\Delta$ determines the maximum amount of time that a floor control server will wait. N is a factor that allows the server to make a quick decision if enough requests arrive. P is a factor that ensures that the server will process calls with a certain priority level (such as emergency calls) immediately. Typically, the three parameters are updated each round based on the statistics of the floor requests received by the server during the preceding round.

In another embodiment, a "preference" parameter is used to ensure that among floor requests of the same priority, requests from previous rounds have precedence over requests received in subsequent rounds. This further enhances the fairness of the system.

Another embodiment of the present invention relates to a method of floor control in a communication network. Subsequent to receiving a first floor request during a floor request round, the system waits a time period before determining a floor winner for the floor request round. The length of the time period is based on the floor request load during the round (or portion thereof, and possibly on other factors.

In another embodiment, a maximum wait time is determined based on the floor request load. The maximum wait time sets a maximum limit on the length of the time period for waiting, e.g., the wait period is no longer than the maximum wait time. The wait period may be a function of: (i) the maximum wait time; (ii) a designated minimum number of received floor requests; and (iii) a designated minimum communication priority level. (By "designated," it is meant determinable in a pre-established manner; thus, it may refer to parameters with a pre-established, fixed value, or to variable parameters whose values may change from round to round, and possibly within a round, based on one or more factors of interest.)

Thus, in another embodiment, a maximum wait time is determined based on the floor request load. If the number of received floor requests rises above a designated level before expiration of the maximum wait time, a temporary floor winner is determined substantially immediately. (By "substantially immediately," it is meant immediately except for processing delays introduced by the system electronics.) The floor is granted to the temporary floor winner if a communication priority associated with the temporary floor winner is at least a minimum priority level. (For example, the floor request received from the temporary floor winner may contain a priority indication or other communication priority associated therewith.) Also, the system may be configured for the floor to be granted to the temporary floor winner if its communication priority is that of an emergency communication in the network.

In another embodiment, the minimum priority level is determined based on the number of floor requests received during the round. For example, the system may be configured so that the minimum priority level decreases as the number of received floor requests increases. Also, the designated received floor request level may be either (i) a fixed value or (ii) a variable whose value is determined in each floor request round based on the number of floor requests received in a previous floor request round.

As noted above, the maximum wait time sets a maximum limit on the length of the wait period. Generally speaking, it may be desirable to grant the floor prior to expiration of the maximum wait period, if the circumstances during the round warrant a speedier determination, e.g., based on factors relating to response time, fairness, and/or priority. Therefore, the system may be configured to determine if one or more of the received floor requests meet various speed-up criteria. "Speed-up" criteria simply refers to a parameter or factor which results in the system determining if the floor should be granted prior to expiration of the maximum wait period, e.g., the decision time is sped up. Thus, if the received floor requests meet the speed-up criteria, the floor winner may be determined substantially immediately. For example, the speed-up criteria may relate to (i) a user identity associated with a received floor request (e.g., if the user identity is that of an emergency worker, the system substantially immediately determines if the floor should be granted to the user) and (ii) a variable priority threshold value (e.g., if a temporary floor winner meets the priority threshold value, the floor is granted thereto).

BRIEF DESCRIPTION OF THE DRAWINGS

The present invention will be better understood from reading the following description of non-limiting embodiments, with reference to the attached drawings, wherein below:

FIG. 7 illustrates the operation of a preference field, which ensures that, among floor requests of the same priority, requests from previous rounds have precedent over requests arriving in subsequent rounds; and FIG. 8 illustrates how the preference field is reset.

DETAILED DESCRIPTION

Figure 1A:
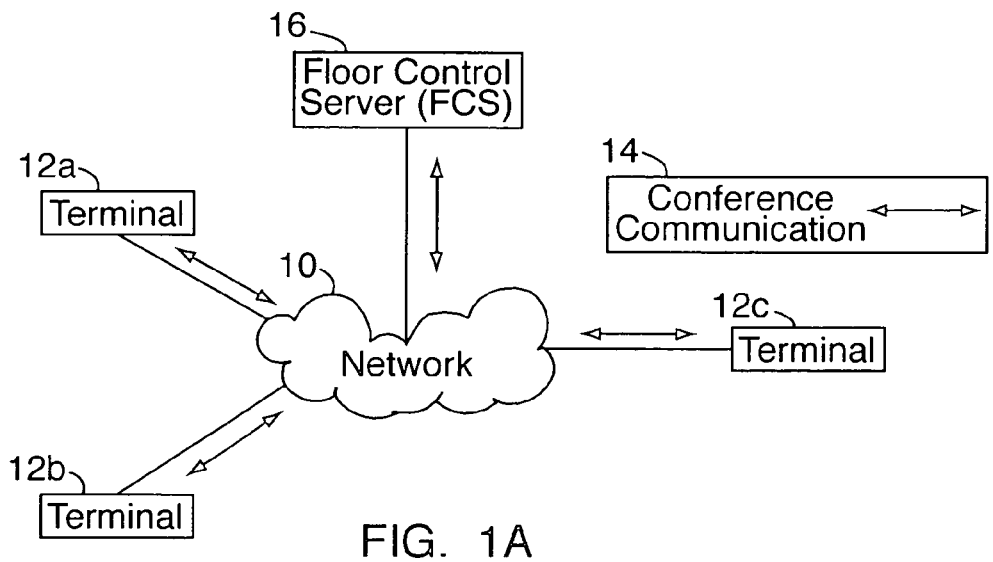
FIG. 1A is a schematic diagram of a conference call over a network.
Figure 1B:
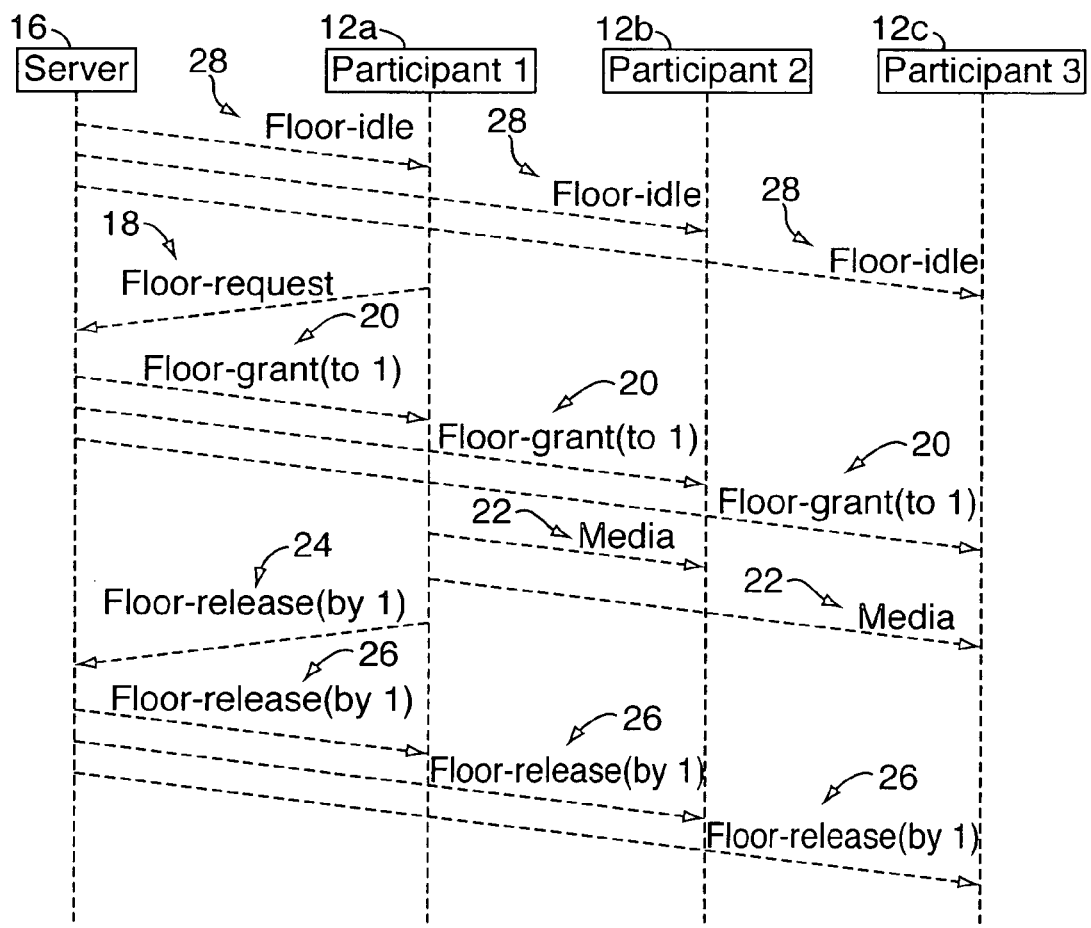
FIG. 1B is a signaling diagram of a basic floor control protocol for a conference call.
Figure 2:
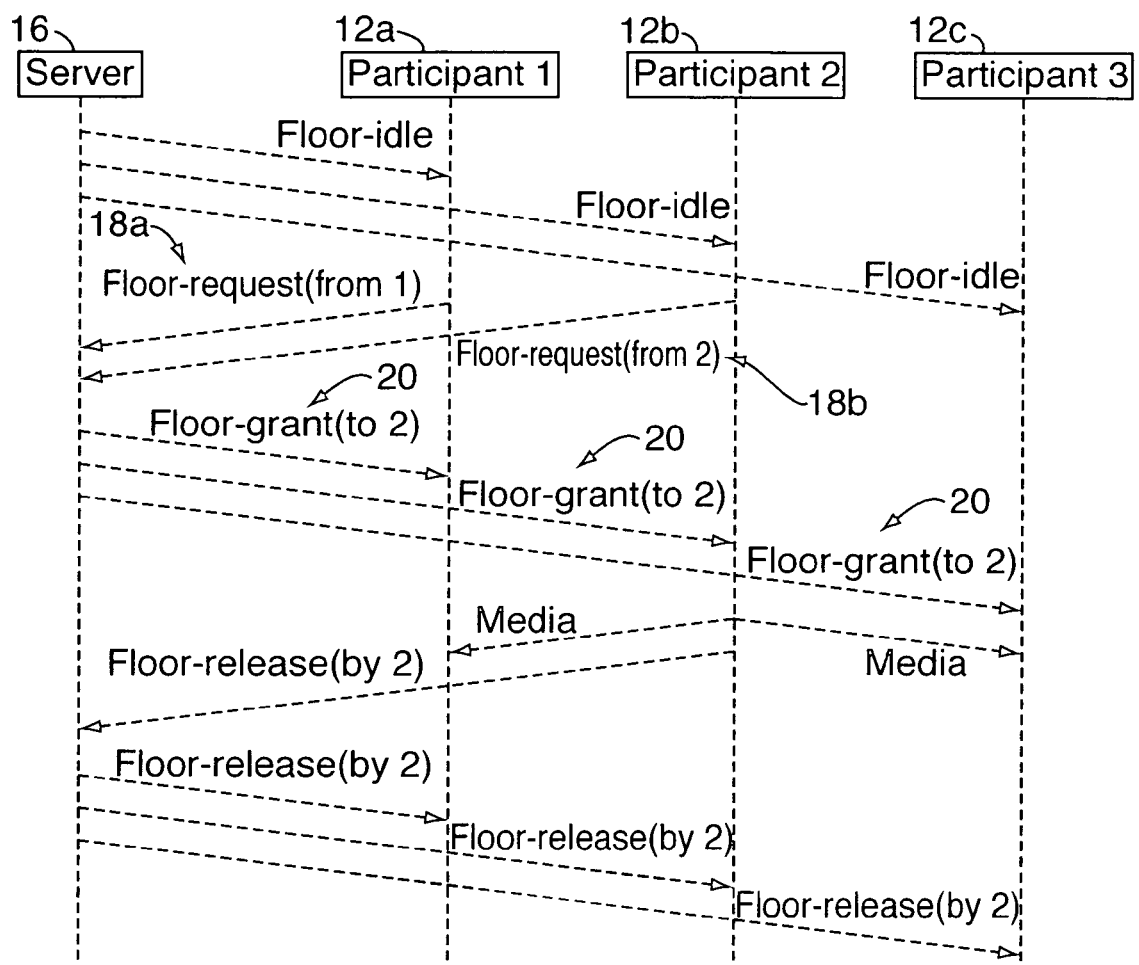
FIG. 2 is a signaling diagram of a floor contention process.
Figure 3B:
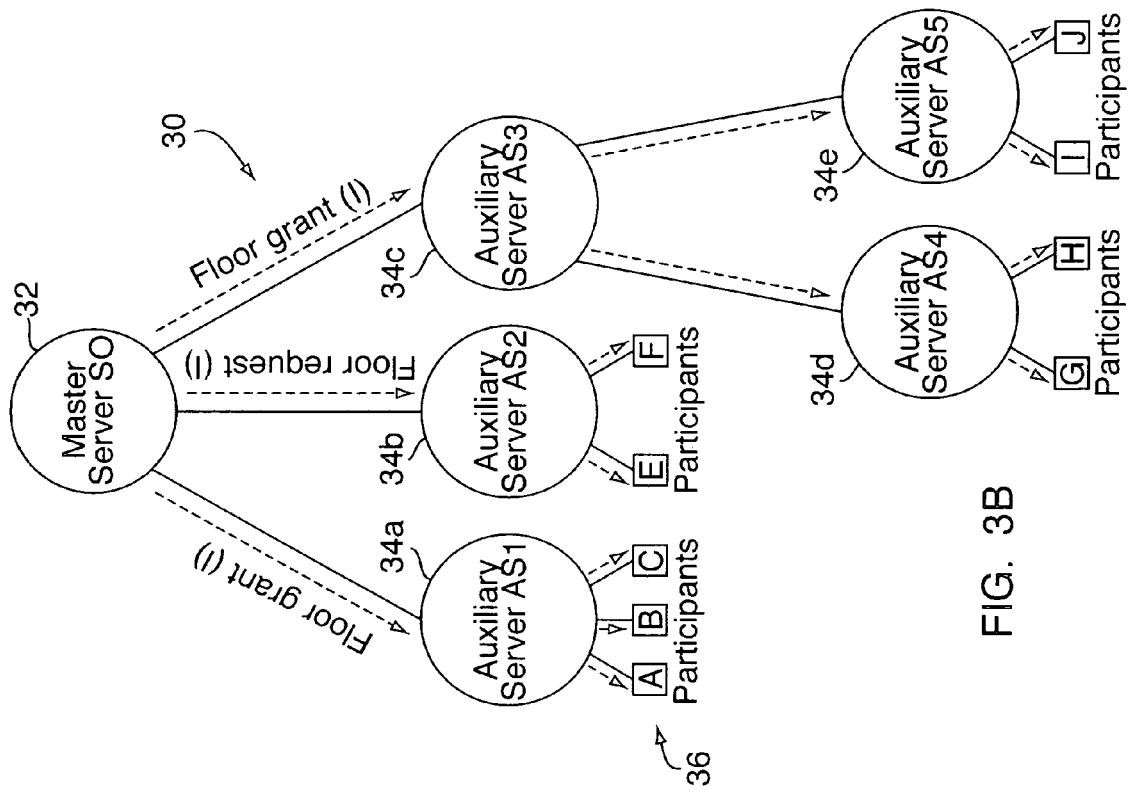
FIGS. 3A and 3B are schematic diagrams showing operation of a hierarchical server network.
Figure 3A:
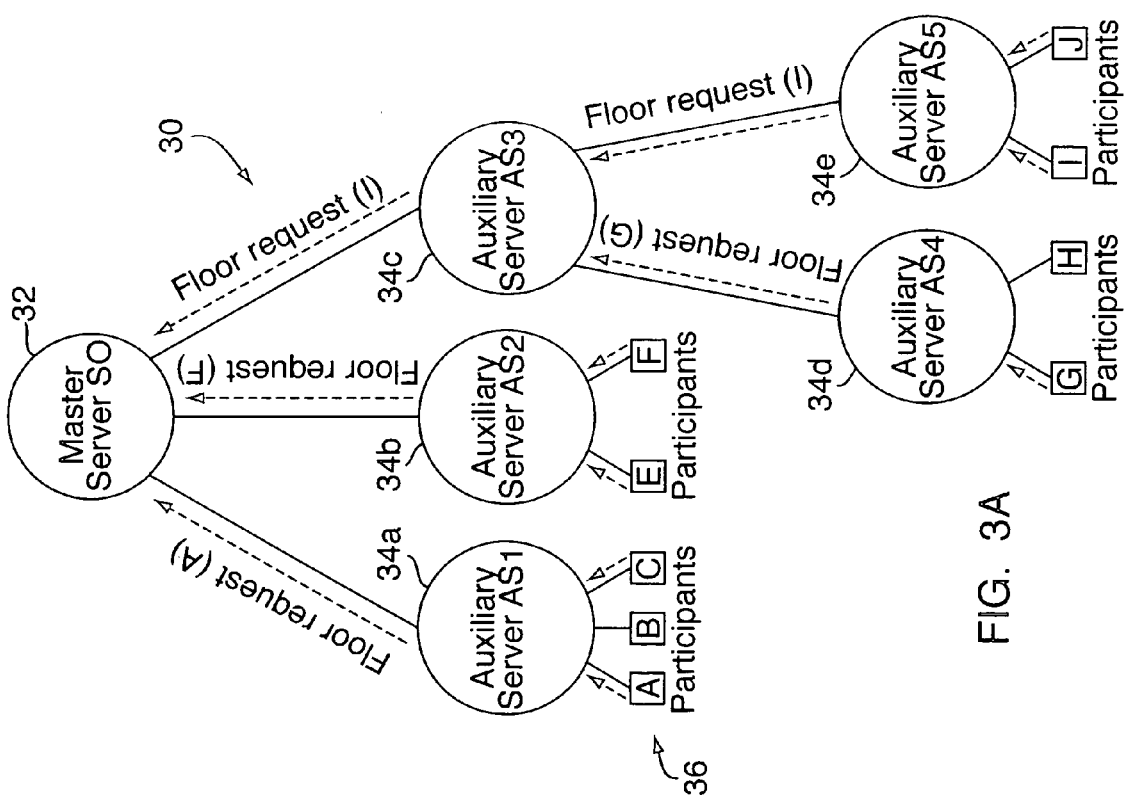

Turning now to FIGS. 4A-8, the present invention relates to a method and system 40 of floor control in a communication network 42, for controlling a conference-type communication application, push-to-talk application, or other type of multi-participant, floor-based communication (collectively, "conference call"). In the network 42, as described above, one or more floor control servers 44 control the conference call as between participants 46a-46c. ("Participant" refers to an electronic device/terminal for communicating over the network.) The server 44 is configured to carry out a floor determination process 48 that includes an adaptive waiting function 50. Upon receiving a first or initial floor request message 52, the server 44 waits for additional requests from other participants before making a decision to award the floor to one of the participants 46a-46c. Under the adaptive waiting function 50, the server's wait time 54 is a function of the request load 56. When the system is lightly loaded, the wait time 54 is generally small, recognizing that with only a few participants requesting the floor it is likely that all will soon receive a turn to communicate. In this situation, a short response time is typically more important than fairness. During periods with larger numbers of floor requests, participants may be unintentionally locked out for an extended duration, and, as a result, it is more important to enforce fairness. Thus, at a high request load 56, the system 40 typically waits a longer period 54 to ensure a reasonable amount of requests are received before determining the floor winner.

As should be appreciated, in prior art FCFS-based systems, the system does not wait for multiple floor requests, and fairness suffers. In systems where the server waits a fixed time interval before determining the floor winner, the response time suffers. In the system 40 of the present invention, the adaptive waiting function 50 provides a fast response time and a favorable degree of fairness in assigning the floor during a conference call. During light loads, the system 40 behaves like a FCFS system with a good response time. As the request load increases (e.g., more participants 46a-46c requesting the floor), fairness is introduced so that all participants requesting the floor have a fair chance of gaining access to the floor.

In another embodiment, participants who have lost floor determinations in previous rounds of contention are given a better chance of winning in subsequent rounds. Thus, fairness is improved. This capability is implemented through the use of a "preference" parameter 58 in the floor-request messages 52. Initially, the preference field (e.g., the field in the message that contains the preference parameter value) is encoded with a 0 value. Every time the participant's floor request message is not granted (e.g., the participant loses the floor to another participant), or if the participant is pre-empted and loses the floor, the value of this field is incremented by a fixed value (e.g., 1) and this increased value is reflected in the next floor request. In another embodiment, preference value increases may be restricted (e.g., once every S seconds) to prevent users from upping their preference parameter values and flooding the system with floor requests. For participants with the same priority class, the server 44 gives preference to the one with the higher preference value. This ensures that participants who have lost in previous rounds will have an increased chance of winning future rounds. In one embodiment, the preference parameter is never reset to zero. In another embodiment, the preference parameter is reset only after the participant is granted the floor. In yet another embodiment, the preference parameter is reset if the participant does not request the floor after the current round.

Regarding operation of the server 44, when the current participant yields the floor, the server 44 broadcasts floor-termination messages to all participants 46a, 46c indicating that the floor is now open for contention. Participants who want the floor then send floor requests 52 to the server 44. The contention round starts when the server receives the first request 52 from the participants 46a-46c.

The server 44 maintains three parameters: $\Delta_m$, $N_m$, and $P_m$. The values of these parameters are determined by the events that occurred in the previous contention round. The manner in which $\Delta_{m+1}$, $N_{m+1}$, and $P_{m+1}$ are computed from events in the previous round is described further below.

The parameter $\Delta_m$ defines the maximum amount of time that the server 44 will wait before it determines the floor winner. Typically, the floor winner is the participant who transmitted the floor request with the highest contention priority. If there is more than one request with the highest contention priority (or if no contention priorities are provided), the preference parameter 58 is used as the tiebreaker. If there is more than one request with same contention priority and preference value, the winner is the one that arrived the earliest. Alternatively, if there is more than one request with same contention priority and preference value, the winner may be chosen randomly (e.g., "coin flip").

In order to improve response time further, the server may speed up the decision process by executing the floor determination process 48 after the server receives $N_m$ requests. Prior to receiving $N_m$ requests, the server may monitor the contention/preemption priorities associated with the less than $N_m$ requests; if the highest priority associated with the less than $N_m$ requests (the temporary floor winner) exceeds $P_m$, the floor request with highest priority is declared the winner and the floor determination process stops. If the highest priority value is smaller than $P_m$, the server 44 proceeds to wait for additional requests, or until the wait interval reaches $\Delta_m$.

Figure 4A:
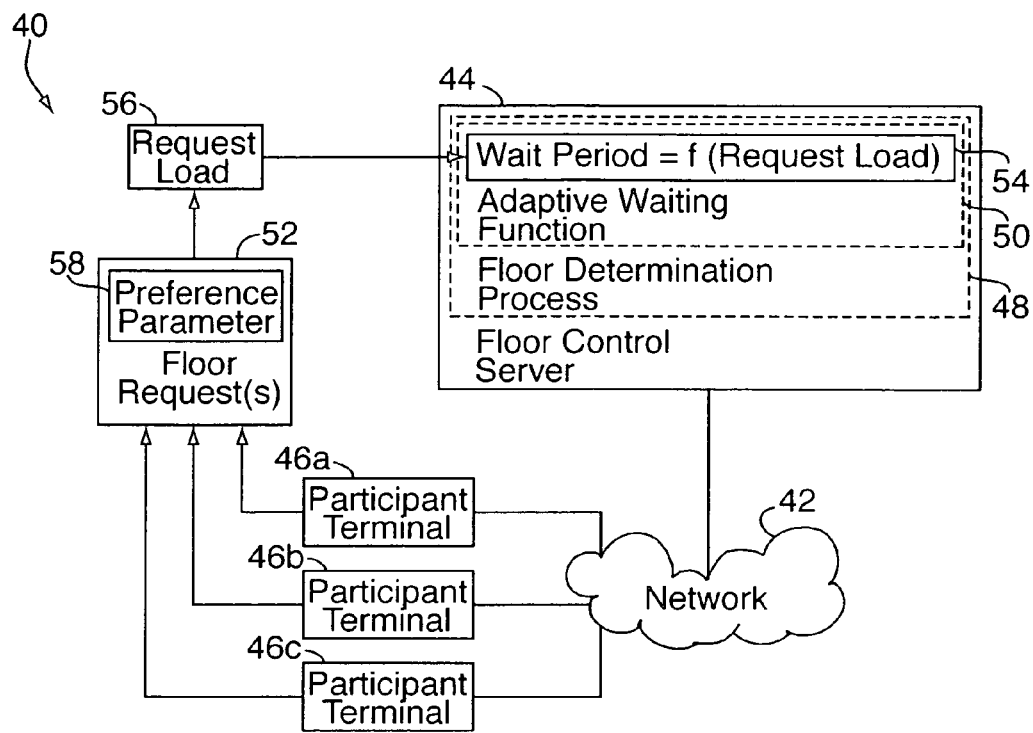
FIG. 4A is schematic view of a floor control system according to an embodiment of the present invention.
Figure 4B:
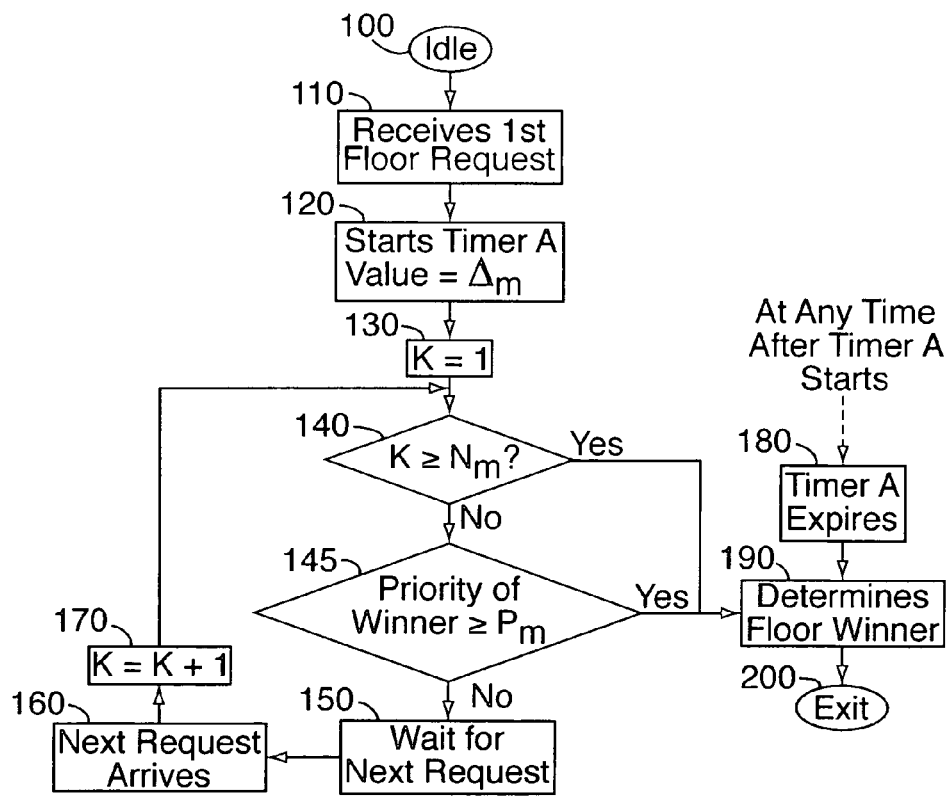
FIG. 4B is a flowchart of a floor determination process according to an embodiment of the present invention.

The above-described process is further illustrated in the flow chart in FIG. 4B. At Step 100, the server 44 starts at the idle state waiting for floor requests 52 from the participants 46a-46c. At Step 110, the first request arrives. At Step 120, the server 44 starts a timer "A," with a value equal to $\Delta_m$. At Step 130, a value "K" is set equal to 1. K keeps track of the number of requests 52 arriving at the server 44. At Step 140, K is compared with $N_m$. If $K \geq N_m$, the process continues at Step 190, where the server determines a floor winner among all the requests. It then exits the process at Step 200. If $K < N_m$, server 44 would proceed to Step 145. At Step 145, server 44 determines a temporary floor winner and compares its priority, $P_{winner}$, with $P_m$. If $P_{winner} \geq P_m$, the process continues at Step 190 for the server to determine a floor winner. Otherwise, the process continues at Step 150, and server 44 waits for the next requests to arrive. Two events can occur in this state. Either the next request(s) arrives, in which case the process continues at Step 160, or the timer A expires, as at Step 180. At Step 160, the next request arrives, and the process continues at Step 170, where K is updated to K+1. The process continues back at Step 140. At Step 180, if at any time the timer A expires, the process continues at Step 190 where the floor winner is determined and the floor determination process 48 is exited.

As should be appreciated, according to the method illustrated in FIG. 4B, the server will check whether a number of requests have arrived already. If so, the server determines a winner to speed up the process. This is at Step 140. Then, the server checks whether the incoming call is of high priority. If the priority exceeds a certain level, then a winner will be determined immediately, as at Step 145. Otherwise, the server 44 waits for new requests or the expiration of timer A.

Steps 140 and 145 constitute the speed-up decision logic at server 44. There are many possible embodiments of this logic. The one described above is simple but effective. In another embodiment, the priority threshold $P_m$ is not a fixed number, but varies depending on the number of requests. As the number of requests increases, the value of the threshold could decrease.

The speed-up decision logic at server 44 may not even depend on the number of incoming requests and their priority level. In yet another embodiment, requests from certain users such as a police captain or fire chief may be granted the floor immediately. The present invention accommodates any speed-up decision logic.

Figure 5:
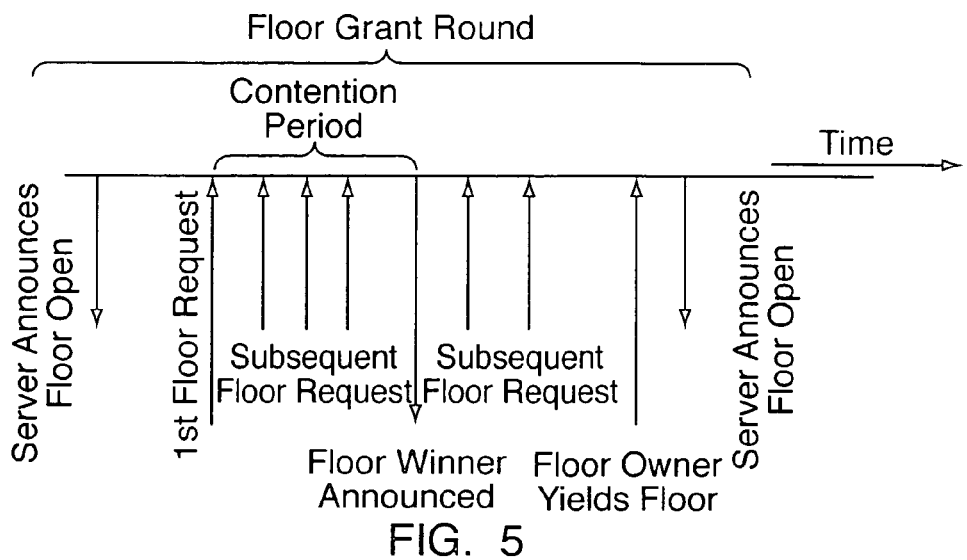
FIG. 5 is an illustration of a floor-grant round. The floor grant round determines the floor requests used in updating internal parameters of the floor determination process shown in FIGS. 4A and 4B.

Regarding calculation of $\Delta_{m+1}$, $N_{m+1}$, and $P_{m+1}$, the server 44 maintains statistics for all floor requests 52 arriving during a floor-grant round. A floor-grant round extends from when the first floor request arrives to the time that the floor winner yields the floor. FIG. 5 is an illustration of a floor-grant round. Note that floor requests can arrive after the floor is awarded.

If during the current floor-grant round, the server 44 receives a floor request 52 that preempts the current floor owner, the values of $\Delta$, N, and P remain unchanged. That is:

$$\Delta_{m+1} = \Delta_m$$

$$N_{m+1} = N_m$$

$$P_{m+1} = P_m$$

Most times, there will not be preemptive floor requests. Let there be a total of "L" floor requests 52 that arrive in the $m^{th}$ floor-grant round. Let request $r_i$ arrive at $t_i$, with priority $p_i$, $1 \leq i \leq L$. The same participant may submit more than one floor request to the server. The usual case is that the later requests have higher priorities than the preceding ones. If so, the floor request with the highest priority is selected, and the remaining floor requests are excluded. If there is more than one request from the same participant with the same priority, the earliest one is selected. This happens when the participant submits the same request multiple times to ensure that the server receives the request.

With no loss of generality, assume $t_1 < t_2 < \ldots < t_L$. Let $\tau_i = t_i - t_1$ be the time between the $i^{th}$ floor request arrival and the first arrival. $\tau_i$ refers to the arrival times of the requests. Let "u" be the median of $\tau_i$, $i = 2, \ldots, L$, with the arrival time for the floor winner excluded.

The above-described process is repeated, but only for floor requests whose contention priorities and/or preference values are greater than 0. Let "v" be the median of the arrival times of this reduced set of floor requests. Let $P_{high}$ be the highest priority of all the requests, excluding that of the floor winner. Among all the requests with the highest priority $P_{high}$, the arrival time of the first is designated as time "s."

Then, $\Delta_{m+1} = \text{maximum}(u, v, s)$.

Regarding the rationale for this calculation, consider the simple case where the floor requests 52 all have the same priority, and assuming that the behavior of the next round is similar to the current round. The server waits so that a fair selection can be made. The parameter u is a prediction of the wait for half of the requests. This parameter can be adjusted by multiplying u with a factor between 0 and 2. If the particular application (e.g., conferencing or push-to-talk) requires fast response times, then u is multiplied with a factor less than 1. If fairness is more important, u is multiplied with a factor greater than 1.

However, there will be floor requests with higher priorities and/or higher preferences, in particular, requests with high preference values. These are requests that have lost in previous rounds. The server 44 waits for these requests to ensure a fair selection based on the parameter v. The selection process of v is identical to u except that only requests with priorities and/or preferences greater than 0 are considered. Again, the parameter v can be adjusted by a multiplicative factor.

According to parameter s, the server 44 waits for the request with the highest priority s can also be adjusted by an additive factor.

The process described above could be varied in many ways, depending on the particular application and the characteristics of the network. For example, instead of using the median of the arrival times, the average or mid-span may be used, e.g., $\frac{1}{2}*(\tau_L-\tau_1)$. Also, upper bounds will typically be placed on the parameters so that the floor determination period is not too large. The bounds depend on the size of the conference, the network technology, the network topology, and the like.

The parameter $N_m$ can be set to be a constant number depending on the number of active participants of the group. In another embodiment, it is set to be a fraction of the number of requests of the previous round. Other configurations are possible.

The parameter $P_m$ may be set so that all emergency calls are processed immediately. As remarked previously, its value may decrease as the number of requests (the parameter K) increases. Other configurations are also possible.

Regarding the initial values for $\Delta$, N, and P, in the simplest form, the initial value for $\Delta$, N, and P would be 0, assuming that priority 0 is the lowest priority. For these values, the floor determination process 48 is equivalent to FCFS in the initial round. However, the process adapts to the traffic load and fairness will be introduced as the request load 56 increases. Other initial values are possible.

Figure 6:
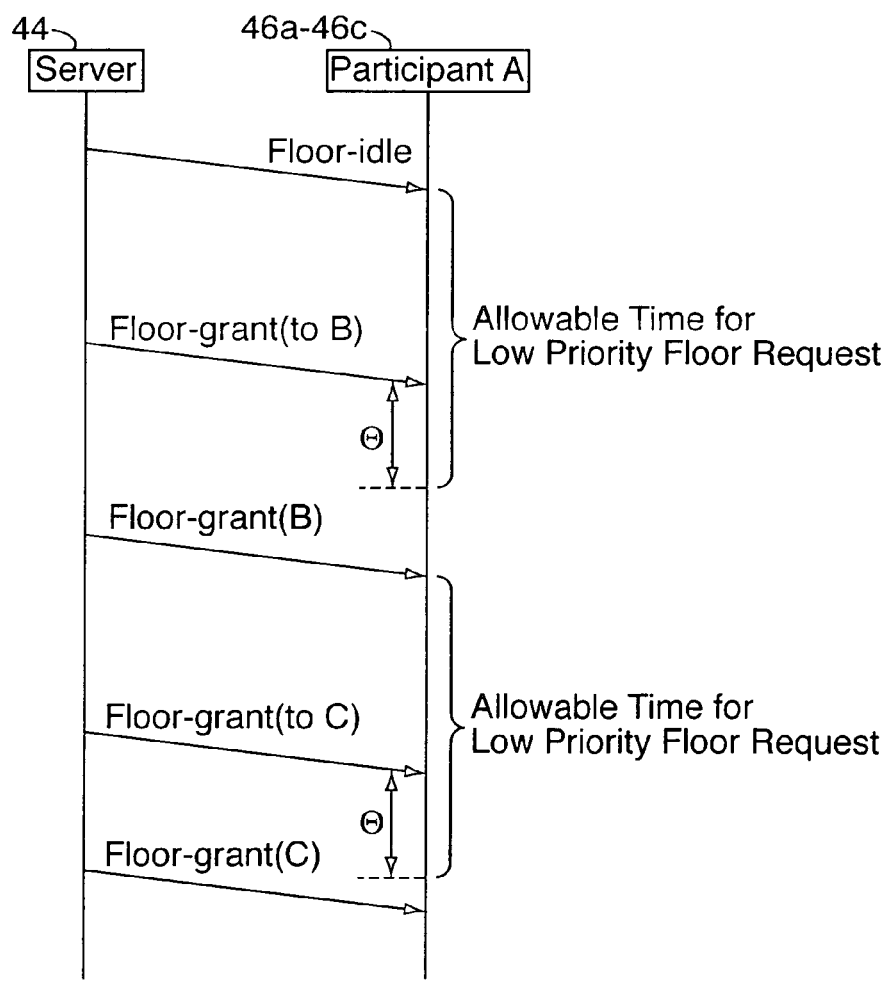
FIG. 6 illustrates the time span of when a participant terminal may submit a low priority floor request.

Regarding control logic at the participant terminals 46a-46c, a participant could still submit floor requests 52 to the server 44 even when the floor has been already awarded to another participant. The floor request would not affect floor ownership unless the request is a preemptive request of a sufficiently high value. However, these floor requests might affect the computation of $\Delta_{m+1}$, $N_{m+1}$, and $P_{m+1}$, and it would be advantageous for a participant to submit a floor request after the floor is already awarded if the floor request is of high priority. To avoid long waits at the server, terminals may be configured to prohibit low priority floor requests for a designated time period after the floor has been awarded. This process is illustrated in FIG. 6.

Note that a participant may submit more than a single floor request during a round. Sometimes this happens because the later request has a higher priority. At other times, this happens when the terminal transmits the same request multiple times to ensure delivery to the server.

When a participant loses the floor in a round, it has to re-submit the floor request to contend for the floor again. The server does not queue the previous request to avoid complicating the floor determination process, as discussed previously. However, the preference parameter 58 of subsequent floor requests is increased by 1 each time the participant loses a round of contention. If the participant does not re-submit the request in a subsequent round, the preference parameter is reset to 0. FIGS. 7 and 8 illustrate the operation and resetting of the preference field, respectively.

Although the present invention has been described with respect to a no-memory system, it also applies to systems where requests are queued in memory. In this case, the server or other control unit is provided with the capability to check, at regular intervals, the availability of subscribers that have requested the floor. The server removes the subscriber from the queue if it detects that the subscriber has left the system.

In a hierarchical network, each node could implement its own floor control independent of the others. Since each stage may introduce delay, it may be advantageous to deploy the system of the present invention only at the root of the tree, as well as at selected nodes, to optimize/reduce delay.

The methods, processes, and/or algorithms described herein may be implemented using electronic hardware, software (e.g., scripts, software programs, suites of software programs), or a combination of the two, using standard programming and/or electrical design methods.

Since certain changes may be made in the above-described adaptive method of floor control with fast response time and fairness, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method of floor control in a communication network, said method comprising:
   determining a maximum wait time based on a floor request load;
   subsequent to receiving a first floor request during a floor request round, waiting a time period before determining a floor winner for the floor request round;
   wherein the time period for waiting is no longer than the maximum wait time and the length of the time period is decreased below the maximum wait time based at least in part on an increase of the floor request load.

2. The method of claim 1 wherein the time period is a function of: (i) the maximum wait time; (ii) a designated minimum number of received floor requests; and (iii) a designated minimum communication priority level.

3. The method of claim 2 further comprising:
   determining a floor winner from among the received floor requests, said floor winner having a priority level,
   wherein, if said priority level is at least the minimum communication priority level, the time period for waiting is terminated when a designated minimum number of floor requests is received.

4. The method of claim 1 wherein:
   each of a plurality of floor requests received during the floor request round includes a preference parameter, said floor requests being received from a plurality of terminals;
   the preference parameters relate to the number of times the terminals respectively associated therewith have lost floor determinations in prior floor request rounds; and
   the floor winner is determined based at least in part on the preference parameters.

5. The method of claim 1 further comprising:
   if a number of received floor requests rises above a designated level before expiration of the maximum wait time, determining a temporary floor winner substantially immediately; and
   granting the floor to the temporary floor winner if a communication priority associated with the temporary floor winner is at least a minimum priority level.

6. The method of claim 5 further comprising:
   determining the minimum priority level based at least in part on the number of received floor requests.

7. The method of claim 6 wherein the minimum priority level decreases as the number of received floor requests increases.

8. The method of claim 5 further comprising:
granting the floor to the temporary floor winner if the communication priority associated with the temporary floor winner is an emergency communication priority in the network.

9. The method of claim 5 wherein the designated received floor request level is either (i) a fixed value or (ii) a variable whose value is determined in each floor request round based on a number of floor requests received in a previous floor request round.

10. The method of claim 1 further comprising:
prior to expiration of the maximum wait time, determining if one or more received floor requests meet at least one speed-up criterion; and, if so,
determining the floor winner substantially immediately.

11. The method of claim 10 wherein the speed-up criterion relates to at least one of (i) a user identity associated with one of said one or more received floor requests and (ii) a variable priority threshold value.

12. A method of floor control in a communication network, said method comprising:
determining a maximum wait time based on a floor request load;
in each of a plurality of floor request rounds, subsequent to receiving a first floor request during the floor request round, waiting a time period before determining a floor winner for the floor request round;
wherein the length of the time period is variable from round to round, the time period for waiting is no longer than the maximum wait time, and the length of the time period in each round is decreased below the maximum wait time based at least in part on an increase of the floor request load during the round.

13. The method of claim 12, wherein the time period for the round is a function of: (i) the maximum wait time; (ii) a designated minimum number of received floor requests; and (iii) a designated minimum communication priority level.

14. The method of claim 12 wherein, in each round:
each of a plurality of floor requests received during the floor request round includes a preference parameter, said floor requests being received from a plurality of terminals;
the preference parameters relate to the number of times the terminals respectively associated therewith have lost floor determinations in prior floor request rounds; and
the floor winner is determined based at least in part on the preference parameters.

15. The method of claim 12 further comprising, in each round:
tracking the number of floor requests received during the floor request round;
if the number of received floor requests rises above a designated level before expiration of the maximum wait time, determining a temporary floor winner; and
granting the temporary floor winner the floor if a communication priority associated with the temporary floor winner is at least a designated minimum priority level.

16. A method of floor control in a communication network, said method comprising:
subsequent to receipt of a first floor request during a floor request round, determining a maximum wait period as a function of a floor request load; and
waiting a time period before determining a floor winner for the floor request round;
wherein the time period is no longer than the maximum wait period, the length of the time period is variable from round to round, and the length of the time period in each round is decreased below the maximum wait time based at least in part on an increase of the floor request load during the floor request round.

17. The method of claim 16 wherein:
each of a plurality of floor requests received during the floor request round includes a preference parameter, said floor requests being received from a plurality of terminals;
the preference parameters relate to the number of times the terminals respectively associated therewith have lost floor determinations in prior floor request rounds; and
the floor winner is determined based at least in part on the preference parameters.

18. The method of claim 16 further comprising:
tracking the number of floor requests received during the floor request round;
if the number of received floor requests rises above a designated level before expiration of the maximum wait period, determining a temporary floor winner; and
granting the temporary floor winner the floor substantially immediately if a communication priority associated with the temporary floor winner is at least a designated minimum priority level.

19. The method of claim 16 wherein an actual wait the time period is a function of (i) the maximum wait period; (ii) a designated minimum number of received floor requests; and (iii) a designated minimum communication priority level.

* * * * *